IMAGE REPRODUCING DEVICE

Filed Aug. 20, 1956

INVENTOR
GESINUS DIEMER
JOHANNES GERRIT VAN SANTEN
BY [signature]
AGENT

United States Patent Office 2,882,419
Patented Apr. 14, 1959

2,882,419

IMAGE REPRODUCING DEVICE

Gesinus Diemer and Johannes Gerrit van Santen, Eindhoven, Netherlands, assignors, by mesne assignments, to North American Philips Company, Inc., New York, N.Y., a corporation of Delaware Application August 20, 1956, Serial No. 605,119

Claims priority, application Netherlands September 8, 1955

6 Claims. (Cl. 250—213)

This invention relates to image reproducing devices comprising plural solid-state image intensifiers.

Solid-state image intensifiers include an electroluminescent material together with a semi-conductive material, the electrical properties of which can be reversibly modified by irradiation, hereinafter to be referred to as photo-sensitive, variable impedance material in the form of a two-dimensional extension which is arranged between electrodes across which an electric voltage is applied. In such devices, the variations in the photo-sensitive material which are produced by irradiation provide a local control of the light emission of the electroluminescent material.

To understand the invention and its background, reference is had to the accompanying drawing, in which.

Figure 1:
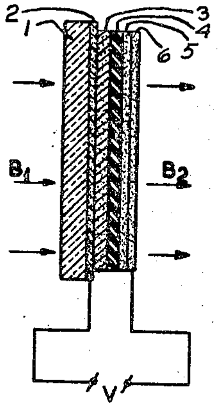
Fig. 1 shows a known image intensifier.

As is shown diagrammatically in Fig. 1 of the accompanying drawing, a known image intensifier may comprise a number of layers applied to a glass plate in direct contact with one another. In the device shown in Fig. 1, a glass plate 1 acting as a support has applied to it, reckoned from left to right, in succession: a thin transparent electrode 2, a layer 3 consisting substantially of a photo-sensitive material, for example cadmium sulphite, a thin opaque intermediate layer 4, which may, for example, be a black lacquer or a mosaic of minute metal particles, a layer 5 consisting substantially of an electroluminescent material, for example zinc sulphide activated with copper and aluminum, and finally a second transparent electrode 6, which similarly to the electrode 2 may consist of a thin layer of gold or conductive stannic oxide or of a metal grid. The glass plate 1 can be replaced by a layer made from a fabric of thin glass filaments, so that it is slightly flexible. Upon the electrodes 2 and 6 an electric voltage V is impressed, for which voltage the layers 3, 4 and 5 are connected in series. The voltage V, which is referred to as the operating voltage, may be a direct voltage; however, as a rule an alternating voltage or a voltage consisting of periodic pulses or pulse trains is preferably used. If by a beam of rays coming from the left-hand side of the figure, indicated by $B_1$ an image is produced on the photo-sensitive layer 3, so that the electric conductivity and/or the dielectric constant of the photosensitive material—and consequently the electric impedance of this layer—is varied locally in accordance with the intensity of the incident radiation, the division of the voltage V across the series-connected layers 3, 4 and 5 is also varied locally, the voltage across the electroluminescent layer 5 being increased to a higher or lesser extent. As a result, the electroluminescent, indicated by $B_2$, layer 5 shows electroluminescence in the pattern of the image produced on the layer 3 by the incident radiation.

It has already been proposed to connect a number of solid-state image intensifiers in cascade optically, the electroluminescent radiation of a preceding solid-state image intensifier producing an image on the photo-sensitive layer of a subsequent solid-state image intensifier. Such a cascade connection can be effected by interposing an optical system between adjacent image amplifiers; however, frequently it is simpler to arrange adjacent image amplifiers in direct contact with one another. In the cascade arrangement described in this prior suggestion, it is indicated that the various image intensifiers are connected to the same voltage supply and consequently are fed with the same voltage at the same frequency. It has now been found that this method of feeding a number of cascade-connected solid-state image intensifiers results in the production of an image which frequently falls short of expectations, particularly with respect to brightness and contrast. It is an object of the invention to provide a measure by which this disadvantage is mitigated.

According to the invention, an image reproducing device comprising at least two optically cascade-connected solid-state image intensifiers of the kind described in the preamble is characterized in that the frequencies of the operating voltages of the successive image intensifiers are so chosen that the input level of each intensifier lies within the operating range of this intensifier.

The term "input level of an image intensifier" as used herein is to be understood to mean the intensity of the irradiation of the photo-sensitive layer in the half-tones of an image produced on this layer by an external source of radiation, for example a preceding image intensifier.

Figure 2:
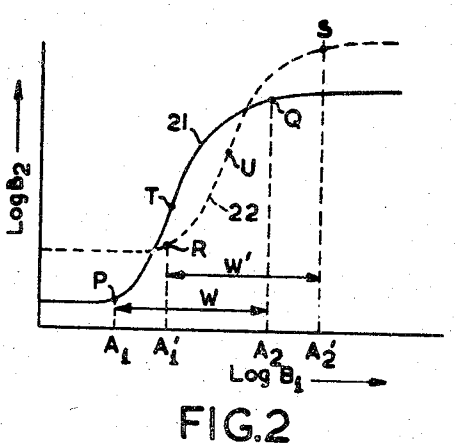
Fig. 2 shows the radiation output-input characteristic curves of typical image intensifiers.

The term "operating range" is to be understood to mean the interval for the intensity of irradiation $B_1$ of the photo-sensitive layer, within which interval a variation of $B_1$ produces a variation in the brightness $B_2$ of the electroluminescent layer. The curve by which in a given image intensifier under pre-determined conditions the relationship between $B_1$ and $B_2$ is illustrated, which may be seen in Fig. 2, is referred to as the output-input characteristic of the intensifier. For the sake of clarity, frequently log $B_2$ is plotted against log $B_1$, the resultant curve being herein referred to as the logarithmic characteristic. This logarithmic characteristic depends upon the structure of the image intensifier and the nature of the materials used in it, the nature of the radiation upon the photo-sensitive layer, and the nature and value of the operating voltage across the electrodes. When the electroluminescent light does not produce feedback in the photo-sensitive material, the logarithmic characteristic is shaped in the form of the curve 21 (solid line) in Fig. 2, i.e. for values of log $B_1$ below a certain limit $A_1$ and for values of log $B_1$ above a certain limit $A_2$ it is substantially horizontal with an intermediate ascending part. The intensity interval W of $B_1$ between $A_1$ and $A_2$ is referred to as the operating range, and this range consequently covers the ascending part PQ of the logarithmic characteristic.

When on the photo-sensitive layer of a solid-state image intensifier a radiation image is produced, the contrasts in this image will produce contrasts in the electroluminescent image insofar as they fall within the operating range of the image intensifier.

Hence, in a cascade arrangement of at least two image intensifiers having different input levels, a satisfactory image reproduction is only produced when the operating ranges of the image intensifiers are different. It has been found that the situation of the operating range depends upon the operating voltage in so far that it is substantially determined by the frequency only of the operating voltage. Thus, in a similar image intensifier with a frequency of the operating voltage which exceeds the frequency producing the curve 21 of Fig. 2, the curve 22 is obtained which is shown as a broken line. The new operating range W′ which is determined by the abscissae $A'_1$ and and $A'_2$ associated with the terminal points R and S of the ascending portion of the curve 22, is shifted with respect to the operating range W of the characteristic 21 to higher intensities of $B_1$. Consequently, the choice of the frequency of the operating voltage enables an image intensifier to be matched to its input level.

The invention will now be described in detail with reference to two embodiments shown, by way of example, in Figures 3 and 4 of the accompanying drawing.

Figure 3:
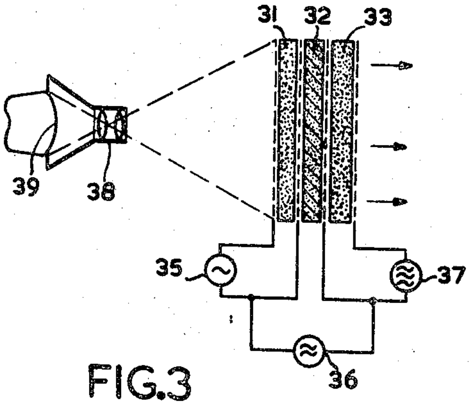
Figs. 3 and 4 are views of two embodiments of the image reproducing device of the invention.

Fig. 3 shows diagrammatically a cascade arrangement of three solid-state image intensifiers 31, 32 and 33, the electroluminescent layer of one intensifier facing the photo-sensitive layer of the next subsequent amplifier. The intensifiers are arranged in direct contact with one another, so that the electrode on the electroluminescent layer of one intensifier is in contact with the electrode on the photo-sensitive layer of the next subsequent solid-state image intensifier. These two electrodes can be replaced by a single electrode which is in contact not only with the electroluminescent layer of one intensifier, but also with the photo-sensitive layer of the other image intensifier. On the photo-sensitive layer of the intensifier 31, an image of the screen 39 of a television projection tube is produced by means of an optical system 38.

An alternating-voltage supply 35 supplies an operating voltage $V_1$ to the image intensifier 31, an alternating voltage supply 36 supplies an operating voltage $V_2$ to the intensifier 32 and an alternating-voltage supply 37 supplies an operating voltage $V_3$ to the image intensifier 33. The amplitudes of the voltages $V_1$, $V_2$ and $V_3$ are substantially equal, however, their frequencies are different. The frequency $f_1$ of the voltage $V_1$ is lower than the frequency $f_2$ of the voltage $V_2$ which in turn is lower than the frequency $f_3$ of the voltage $V_3$. The ratio of these frequencies is so chosen that the operating ranges of the intensifiers 32 and 33 are matched to the mean brightness of the electroluminescent layers of the preceding amplifiers 31 and 32, respectively.

When the mean gain factor in the operating range is $F_1$ for the image intensifier 31 and $F_2$ for the image intensifier 32, this condition is satisfied if $$\frac{f_2}{f_1}=F_1$$

and $$\frac{f_3}{f_2}=F_2$$

The frequency $f_1$ is more or less determined by the input level of the intensifier 1, i.e. the mean light intensity on the photo-conductive layer. This input level is determined by the brightness of the half-tones in the image on the screen 39 and by the constants of the optical system 38. With a low input level, a low frequency $f_1$ is chosen, which for practical reasons generally will not be much lower than 50 c./s. If, for example, $f_1$ is made 50 c./s. and the intensification of each of the amplifiers 31 and 32 is ten, satisfactory results are produced when $f_2$ is about 500 c./s. and $f_3$ is about 5000 c./s.

Figure 4:
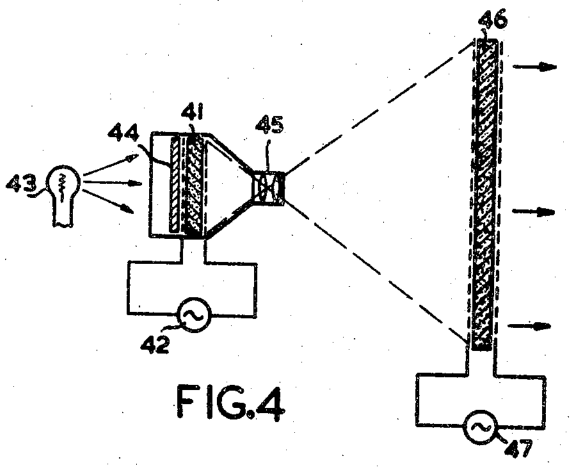

In Fig. 4, reference numeral 41 denotes a solid-state image intensifier similar to that shown in Fig. 1, the electrodes being connected to a voltage supply 42. This voltage supply supplies an alternating voltage having a frequency $f_4$ of about 100 c./s. By a source of radiation 43 an image of a photographic positive 44 is produced on the photo-sensitive layer of the intensifier 41, and under the action of this image the electroluminescent layer of this intensifier is excited to electroluminescence in the pattern of this image. By means of an optical system 45, an image of the electroluminescent layer of the intensifier 41 is produced on the photo-sensitive layer of a second solid-state image intensifier 46 which only differs from the intensifier 41 with respect to its surface area. This second intensifier 46 is supplied by an alternating current supply 47 which supplies an alternating voltage of frequency $f_5$ to the electrodes of this intensifier. This frequency is so chosen that, if $F_4$ is the gain factor of the amplifier 41 and O is the ratio between the luminance of the electroluminescent layer of the intensifier 41 and the light-intensity incident upon the photo-sensitive layer of the intensifier 46, which ratio is determined by the optical system 45 and the position thereof, the condition $$\frac{f_5}{f_4}=\frac{F_4}{O}$$

is satisfied. If, for example, as has been mentioned hereinbefore, $f_4$=100 c./s., $F_4$=about 50 and O=about 110, $f_5$ is advantageously made about 45 c./s. Thus, the operating range of the intensifier 46 is matched to the image produced on this intensifier by the system 45.

If a solid-state image intensifier should provide a linear intensification within its operating range, the logarithmic characteristic in this range would be a straight line enclosing an angle of 45° with the horizontal axis. However, as a rule the logarithmic characteristic is not straight in the operating range and, in addition, has a steeper slope. As a result, at least if the marginal regions of the operating range are not utilized, the contrast in the output image exceeds the contrast in the input image produced on the photo-sensitive layer. This difference can be reduced, at least partially, in an image reproducing device comprising a number of cascade-connected solid-state image intensifiers by ensuring that one of the intensifiers operates in the lower part of its characteristic, for example the part PT of the curve 21 in Fig. 2, and another operates in the upper part of its characteristic, for example US of the curve 22 of Fig. 2. It will be evident that this can be effected by a proper choice of the frequencies of the operating voltages. Since these parts of the characteristic have opposite curvatures, a total intensification can be effected which is more linear. In this event, it is necessary that the contrast range of the input image of each of these intensifiers is smaller than their operating range.

What it claimed is:

1. An image reproducing device comprising plural, solid-state, image intensifiers each comprising a pair of electrodes and, in juxtaposed relationship, a radiation-responsive, variable-impedance material and a radiation-producing, electroluminescent material whose radiation output depends upon its applied potential, which is controlled by the variable-impedance material, said plural image intensifiers being optically cascaded in such manner that the radiation produced by the electroluminescent material of one intensifier excites the variable-impedance material of another intensifier, means for applying an alternating-current potential at a first given frequency to the electrodes of the first of said cascaded intensifiers to cause said intensifier to operate in an operating range of its radiation output-input characteristic at which a change in input radiation produces a change in its output radiation, and means for applying to the electrodes of a succeeding intensifier an alternating-current potential at a second given frequency at which the succeeding intensifier operates in an operating range of its radiation output-input characteristic at which a change in its input radiation causes a change in its output radiation.

2. A device as set forth in claim 1 wherein the second frequency has a higher value than the first frequency.

3. An image reproducing device comprising plural, solid-state, image intensifiers each comprising a pair of electrodes and, in juxtaposed relationship, a radiation-responsive, variable-impedance material and a radiation-producing, electroluminescent material whose radiation output depends upon its applied potential, which is controlled by the variable-impedance material, said plural image intensifiers being optically cascaded in such manner that the radiation produced by the electroluminescent material of one intensifier excites the variable-impedance material of another intensifier, means for applying an alternating-current potential at a first given frequency to the electrodes of the first of said cascaded intensifiers to cause said intensifier to operate in an operating range of its radiation output-input characteristic at which a change in input radiation produces a change in its output radiation, and means for applying to the electrodes of a succeeding intensifier an alternating-current potential at a second given frequency at which the succeeding intensifier operates in an operating range of its radiation output-input characteristic at which a change in its input radiation causes a change in its output radiation, said plural intensifiers being substantially alike and being mounted adjacent one another and the first of said intensifiers possessing a given mean gain factor, the ratio between the second and first frequencies being substantially equal to the said mean gain factor.

4. An image reproducing device comprising plural, solid-state, image intensifiers each comprising a pair of electrodes and, in juxtaposed relationship, a radiation-responsive, variable-impedance material and a radiation-producing, electroluminescent material whose radiation output depends upon its applied potential, which is controlled by the variable-impedance material, said plural image intensifiers being optically cascaded in such manner that the radiation produced by the electroluminescent material of one intensifier excites the variable-impedance material of another intensifier, each of said intensifiers having a radiation output-input characteristic including a first substantially horizontal portion, a second ascending portion, and a third substantially horizontal portion, means for applying an alternating-current potential at a first given frequency to the electrodes of the first of said cascaded intensifiers to cause said intensifier to operate in the ascending portion of its radiation output-input characteristic, and means for applying to the electrodes of a succeeding intensifier an alternating-current potential at a second given frequency at which the succeeding intensifier operates in the ascending portion of its radiation output-input characteristic.

5. A device as set forth in claim 4 wherein said first frequency has a value at which the first intensifier operates along the initial part of the ascending portion of its characteristic, and the second frequency has a value at which the succeeding intensifier operates along the terminal part of the ascending portion of its characteristic, thereby to improve the linearity of the device.

6. A device as set forth in claim 4 wherein the frequency has a higher value than the second frequency, and the first intensifier is smaller than the succeeding intensifier.

References Cited in the file of this patent

UNITED STATES PATENTS

| | | |
|---|---|---|
| 2,177,360 | Busse | Oct. 24, 1939 |
| 2,594,740 | De Forest et al. | Apr. 29, 1952 |
| 2,773,992 | Ullery | Dec. 11, 1956 |

FOREIGN PATENTS

| | | |
|---|---|---|
| 157,101 | Australia | June 16, 1954 |

OTHER REFERENCES

Orthuber and Ullery: "A Solid-State Image Intensifier," Journal of the Optical Society of America, vol. 44, No. 4, pp. 297–299, April 1954.

UNITED STATES PATENT OFFICE

CERTIFICATE OF CORRECTION

Patent No. 2,882,419 April 14, 1959

Gesinus Diemer et al.

It is hereby certified that error appears in the printed specification of the above numbered patent requiring correction and that the said Letters Patent should read as corrected below.

Column 6, line 16, after "wherein the" insert -- first --.

Signed and sealed this 27th day of October 1959.

(SEAL)

Attest:

KARL H. AXLINE
Attesting Officer

ROBERT C. WATSON
Commissioner of Patents